United States Patent [19]

Mesnel et al.

[11] Patent Number: 5,274,895
[45] Date of Patent: Jan. 4, 1994

[54] DEVICE FOR THE INSTALLATION OF A PROFILE HAVING A U-SHAPED CROSS SECTION ON A BORDER OF A FRAME OF AN AUTOMOBILE BODY

[75] Inventors: Francois Mesnel, Neuilly-sur-Seine; Gerard Mesnel, Carrieres-Sur-Seine, both of France

[73] Assignee: Establissements Mesnel S.A., France

[21] Appl. No.: 947,264

[22] Filed: Sep. 18, 1992

[30] Foreign Application Priority Data

Sep. 18, 1991 [FR] France .................. 91 11494

[51] Int. Cl.⁵ .................................. B23P 17/00
[52] U.S. Cl. ................................ 29/235; 29/254; 29/821
[58] Field of Search ............ 29/450, 451, 417, 254, 29/235, 821, 701, 293.58; 198/428, 617; 414/744; 901/41, 36, 31, 37, 26; 269/329

[56] References Cited

U.S. PATENT DOCUMENTS

| | | | |
|---|---|---|---|
| 5,031,293 | 7/1991 | Goedderz et al. | 29/235 |
| 5,048,170 | 9/1991 | Kuppers | 29/235 |
| 5,065,486 | 11/1991 | Goedderz | 29/235 |
| 5,068,952 | 12/1991 | Hennen | 29/235 |
| 5,199,154 | 4/1993 | Mesnel et al. | 29/451 |

FOREIGN PATENT DOCUMENTS 0253599 1/1988 European Pat. Off. .
0451023 10/1991 France .
2238339 5/1991 United Kingdom .

OTHER PUBLICATIONS

French Search Report.
English-language version of search report.

Primary Examiner—Robert C. Watson
Attorney, Agent, or Firm—Scully, Scott, Murphy & Presser

[57] ABSTRACT

A device for the installation, on a projecting border (6) of an automobile body frame, of a profile (5a) having a U-shaped cross section including a metal reinforcement jacketed with a resilient material, this device comprising a mallet having a flexible head (4), means (3) for impressing an alternating percussion movement on the head of this mallet and at least one system for guiding the profile (5) capable of bringing the latter in front of that portion of the flexible head (4) of the mallet intended to act on it, this guide system comprising a structure having a U-shaped contour, between the branches (8) of which the profile (5) can be engaged and which can be closed by a movable element capable of substantially joining together the branches (8) of the structure in order to maintain the profile therein. The movable closure element comprises a lever (10) mounted so as to pivot, due to the action of a drive means, in a plane substantially parallel to that of the branches of the U-shaped structure, about a spindle (11) in a position which is fixed in relation to the body (7) of the mallet.

6 Claims, 1 Drawing Sheet

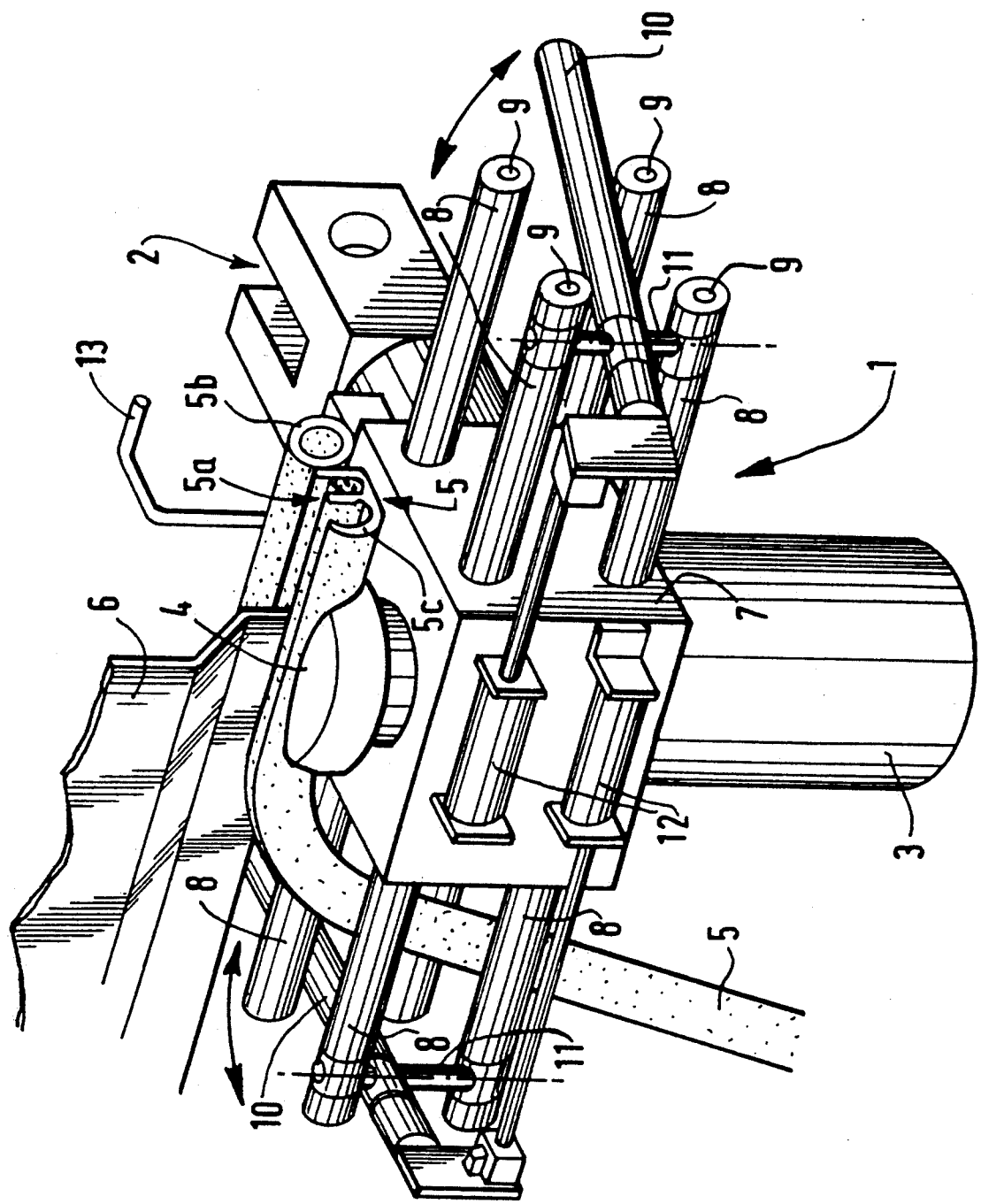

DEVICE FOR THE INSTALLATION OF A PROFILE HAVING A U-SHAPED CROSS SECTION ON A BORDER OF A FRAME OF AN AUTOMOBILE BODY

The subject of the invention relates to a device for the installation of a profile having a U-shaped cross section on a border of a frame of an automobile body or the like. More particularly, it relates to the installation, on frames of automobile doors or on edges of openings of automobile trunks, of seals comprising such a pincer-forming profile, made from reinforced polymer material, and a sealing member adjacent to this profile.

It is known that such seals usually comprise a profile having a U-shaped cross section, comprising a metal reinforcement, jacketed with a flexible material such as rubber or a plastic, this profile being intended to be fixed by pinching to a projecting edge or a projecting portion of an automobile body. This profile is associated with a flexible sealing member, which is tubular for example, intended to be compressed between two portions of the body, a door and its frame for example.

In its European Patent Application No. 91 400 828.9, of 27 Mar. 1991, the Applicant Company has proposed, for the installation on a projecting border of an automobile body of such a profile comprising a substantially non-extensible metal reinforcement, jacketed with a resilient material, a method according to which a length of profile is used substantially equal to that of the body frame to be equipped, a predetermined and optionally referenced portion of the profile is. initially fixed in position at a predetermined location of the border of the body frame, optionally referenced, and, with the aid of a vibrating mallet having a flexible head, set into an alternating percussion movement, the profile is then continuously applied against the border of the body frame, starting from the predetermined location, as far as a first end of the profile and then, still from the said predetermined location, as far as the other end of the profile.

In this same European Patent Application, the Applicant Company has proposed a device for the implementation of this method, this device comprising a mallet having a flexible head and means such as a vibrating tool-carrier for impressing an alternating percussion movement on the head of this mallet.

In a preferred embodiment of this device, the vibrating tool-carrier and the mallet having a flexible head solidly attached to the movable portion of this mallet are carried by an arm of a robot and the implementation of the method is entirely automated with the aid of this conventionally programmed robot.

The mallet having a flexible head, or the structure carrying this mallet, includes at least one member for guiding the profile, capable of bringing the profile into alignment with the portion of the flexible head of the vibrating mallet which acts on the profile and the projecting border onto which the profile is to be mounted.

In a form of implementation described in the European Patent Application mentioned herein above, the member for guiding the profile is constituted by a U-shaped structure, between the branches of which the profile can be engaged and which can be closed in the region of the free end of the branches of the U by means of a removable closure element such as a spindle actuated by an appropriate means.

The object of the present invention is to provide an embodiment variant of a device of this type, of which the member for guiding the profile is more flexible and easier to actuate than that of the device described in this prior application.

The object of the invention is also to provide a variant of the device according to the European Patent Application mentioned herein above, which is more particularly adapted to the installation of a profile including a lip adjacent to the branch of the profile having a U-shaped cross section which is not solidly attached to the sealing member.

The subject of the invention is therefore a device for the installation, on a projecting border of an automobile body frame, of a profile having a U-shaped cross section including a metal reinforcement jacketed with a resilient material, this device comprising a mallet having a flexible head, means for impressing an alternating percussion movement on the head of this mallet and at least one system for guiding the profile capable of bringing the latter in front of that portion of the flexible head of the mallet intended to act on it, this guide system comprising a structure having a U-shaped contour between the branches of which the profile can be engaged and which can be closed by a movable element capable of substantially joining together the branches of the structure in order to maintain the profile therein, this device being characterized in that the movable closure element comprises a lever mounted so as to pivot, due to the action of a drive means, in a plane substantially parallel to that of the branches of the U-shaped structure, about a spindle in a position which is fixed in relation to the body of the mallet, this lever being capable of occupying first position, in which the profile enclosed between the branches of the U-shaped structure the frame and the lever and a second position, in which the lever allows the free profile to be engaged between or disengaged between the branches of the U-shaped structure.

The means for driving the lever may be a simple jack attached to one end of the lever and the pivot spindle upon which the lever pivots will be solidly attached to the framework of the device and parallel to the vibration axis of the percussion head of the vibrating mallet.

In a preferred embodiment for implementing the invention, so as better to guide the profile, each guide system will comprise two structures having a U-shaped contour disposed in parallel and a single lever disposed between the two structures and capable of pivoting in a plane parallel to that of these structures, these being sufficiently close together in order that the lever can close the two structures simultaneously, by substantially joining the two branches of each of them together.

Two guide systems of this type will preferably equip the device according to the invention, these systems being disposed on two opposite and parallel sides of the frame of the device and offset by an angle of 180° in relation to the vibration axis of the percussion head, so as to be able to use the guide system which is the best adapted to the relative positions of the device for installing the profile and of the body to be equipped with this profile.

The framework of the device will advantageously include a hook forming a last, capable, due to the action of an appropriate drive means, of being placed under a cosmetic lip optionally equipping the profile, after installation of the latter on the body, and of moving longitudinally under this lip so as to straighten it. The means for driving this hook may be programmed and the robot driving the device in accordance with the invention may thus carry out in succession the installation of the profile on the body and the correct positioning of the cosmetic lip. The latter operation is normally performed manually by an operator, but it is very irksome and workers have wanted for along time to be able to carry it out mechanically. The invention, therefore constitutes an appreciable advantage to the worker.

A form of implementation of the invention will now be described herein below, by way of non-limiting example, with reference to the single figure, attached to the present document, which is a perspective diagrammatic view of the device.

BRIEF DESCRIPTION OF THE DRAWINGS

FIG. 1 is a view in elevation of the profile installation device.

In this drawing, the whole device is designated by the reference 1. It can be fixed, with the aid of a fork 2 and a nut (not shown), to the arm of a robot.

DETAILED DESCRIPTION OF THE PREFERRED EMBODIMENT

As described in the European Patent Application mentioned herein above, the device comprises a motor 3, for example a compressed-air motor capable of impressing vibrations on the rubber head 4 of a mallet in order to apply and install a profile 5 on the border 6 of a metal sheet of an automobile body. The profile 5 comprises, in a known manner:

a portion having a U-shaped cross section forming a pincer 5a, having a metal reinforcement jacketed with an elastomer, capable of covering the border 6;

a tubular sealing member 5b adjacent to one of the branches of the U of the pincer 5a;

a lip 5c, adjacent to the other branch of the U of the pincer 5a, this so-called "cosmetic" lip having a decorative function.

In order to guide the profile 5, in accordance with the present invention, the framework 7 surrounding the mallet head 4 carries two guide assemblies, each extending from opposite and parallel sides of framework 7; and offset by 180° in relation to the vibration axis of the head 4. Each guide assembly comprises two U-shaped structures disposed in parallel planes, perpendicular to the vibration axis of the head 4, each structure comprises two parallel rollers 8 mounted to freely rotate about spindles 9 solidly attached to the framework 7 the U-shape of the structure is formed by the rollers 8 representing the branches of the U and the framework 7 representing the base of the U. A lever 10 one on each side of framework 7, mounted so as to pivot about a spindle 11, perpendicular to the rollers 8 and solidly attached to the spindles 9 of two of these rollers, is disposed between each of the two pairs of U-shaped structures. Due to the action of a jack 12 carried by the framework 7, the lever 10 therefore pivots in a plane parallel to the planes formed by the U-shaped structures defined by the rollers 8 and it is sufficiently close to the pairs of rollers to close the two contiguous structures simultaneously, by being placed in the immediate vicinity of the free ends of the rollers 8 in order to enclose the profile 5 between the rollers 8, the lever 10 and the framework 7.

The framework 7, moreover, carries a hook 13 forming a last which, after installation of the profile 5 on the sheet-metal border 6, is brought under the lip 5c by a mechanism, not shown, and is moved longitudinally between this lip 5 and the seal 5b, so as to straighten this lip which is deformed during the installation of the profile, without an operator having to intervene manually.

The invention therefore provides an advantageous improvement to the system for automatically installing a profile on an automobile body, which forms the subject of the aforementioned European Patent Application No. 91 400 828.9.

We claim:

1. Device for the installation, on a projecting border (6) of an automobile body frame, of a profile (5a) having a U-shaped cross section including a metal reinforcement jacketed with a resilient material, this device comprising a mallet having a flexible head (4), means (3) for impressing an alternating percussion movement on the head of this mallet and at least one guide system for guiding the profile (5) capable of bringing the latter in front of that portion of the flexible head (4) of the mallet intended to act on it, this guide system comprising a structure having a U-shaped contour, between the branches (8) of which the profile (5) can be engaged and which can be closed by a movable element capable of substantially joining together the branches (8) of the structure in order to maintain the profile therein, this device being characterized in that the movable closure element comprises a lever (10) mounted so as to pivot, due to the action of a drive means, in a plane substantially parallel to that of the branches of the U-shaped structure, about a spindle (11) in a position which is fixed in relation to a framework (7) of the mallet, this lever (10) being capable of occupying a first position, in which the profile is enclosed between lever (10), the branches (8) and framework (7) of the U-shaped structure and a second position, in which the lever (10) allows the free profile to be engaged between or disengaged between the branches (8) of the U-shaped structure.

2. Device according to claim 1, characterized in that the system for guiding the profile (5) comprises two structures having a U-shaped contour which are disposed in parallel and a single lever (10) disposed between the two structures and capable of pivoting between them in a parallel plane, the two structures being sufficiently close together in order that the lever (10) can close them simultaneously, by substantially joining the two branches (8) of each of them together.

3. Device according to claim 2, characterized in that the pivot spindle of the lever (10) is perpendicular to two contiguous branches (8) of the two parallel structures and is solidly attached to these branches.

4. Device according to one of claims 1 to 3, characterized in that the means for driving the lever (10) comprises a jack (12) carried by the framework (7) of the device.

5. Device according to claim 2, characterized in that it comprises two pairs of U-shaped structures disposed on opposite and parallel sides of framework (7) and offset by 180° in relation to the vibration axis of the flexible head (4).

6. Device according to claim 1, characterized in that it includes a hook (13) forming a last, capable, due to the action of a drive means, of being placed under a lip (5c) which is adjacent to the profile 5a having a U-shaped cross section and of moving longitudinally between this profile (5a) and this lip (5c) in order to straighten the latter.

* * * * *